US012020647B2

(12) United States Patent
Nakamura et al.

(10) Patent No.: US 12,020,647 B2
(45) Date of Patent: Jun. 25, 2024

(54) DISPLAY DEVICE AND METHOD FOR DRIVING SAME

(71) Applicant: Sharp Kabushiki Kaisha, Sakai (JP)

(72) Inventors: Kazuo Nakamura, Sakai (JP); Noriyuki Tanaka, Sakai (JP); Masaaki Nishio, Sakai (JP); Yousuke Nakamura, Sakai (JP); Tatsuhiko Suyama, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 18/271,097

(22) PCT Filed: Jan. 13, 2021

(86) PCT No.: PCT/JP2021/000865
§ 371 (c)(1),
(2) Date: Jul. 6, 2023

(87) PCT Pub. No.: WO2022/153403
PCT Pub. Date: Jul. 21, 2022

(65) Prior Publication Data

US 2024/0078975 A1 Mar. 7, 2024

(51) Int. Cl.
*G09G 3/3291* (2016.01)
*G09G 3/3233* (2016.01)

(52) U.S. Cl.
CPC ... *G09G 3/3233* (2013.01); *G09G 2300/0819* (2013.01); *G09G 2310/08* (2013.01);
(Continued)

(58) Field of Classification Search
CPC ......... G09G 3/3233; G09G 2300/0819; G09G 2310/08; G09G 2320/0233;
(Continued)

(56) References Cited

U.S. PATENT DOCUMENTS 6,115,014 A * 9/2000 Aoki .................... G09G 3/3607
345/88
2011/0057917 A1 3/2011 Ryu et al.
(Continued)

FOREIGN PATENT DOCUMENTS

JP 2010-097097 A 4/2010
JP 2011-059648 A 3/2011
(Continued)

OTHER PUBLICATIONS

Official Communication issued in International Patent Application No. PCT/JP2021/000865, mailed on Mar. 30, 2021.

*Primary Examiner* — Abdul-Samad A Adediran
(74) *Attorney, Agent, or Firm* — Keating & Bennett, LLP

(57) ABSTRACT

A display device is provided with: a display portion including a plurality of scanning lines, a plurality of data lines, and a plurality of pixel circuits; a scanning line drive circuit; and a data line drive circuit. The level of a data voltage applied to the data line decreases when a frame frequency is switched higher, and increases when the frame frequency is switched lower. This can prevent a display flicker when the frame frequency is switched. The level of the data voltage may change when the frame frequency is switched, and may return to its initial level over a plurality of frame periods. The timing of the control signal used to drive the display portion may change in accordance with the frame frequency to cause the length of the charging period of the pixel circuit to change in accordance with the frame frequency.

10 Claims, 11 Drawing Sheets

(52) U.S. Cl.
CPC ............... *G09G 2320/0233* (2013.01); *G09G 2320/0247* (2013.01); *G09G 2330/021* (2013.01)

(58) Field of Classification Search
CPC ..... G09G 2320/0247; G09G 2330/021; G09G 3/3696; G09G 3/3607; H01L 27/1225
USPC ........................................... 345/88, 212, 215
See application file for complete search history.

(56) References Cited

U.S. PATENT DOCUMENTS

| | | | | |
|---|---|---|---|---|
| 2013/0002641 | A1* | 1/2013 | Kim | G09G 3/3696 345/212 |
| 2015/0243220 | A1* | 8/2015 | Kim | H01L 27/1225 345/215 |
| 2018/0108299 | A1 | 4/2018 | Nakamura | |

FOREIGN PATENT DOCUMENTS

| | | | |
|---|---|---|---|
| JP | 2018-063351 | A | 4/2018 |
| KR | 10-2019-0048510 | A | 5/2019 |

* cited by examiner

DISPLAY DEVICE AND METHOD FOR DRIVING SAME

TECHNICAL FIELD

The disclosure relates to a display device, and particularly to a self-luminous display device.

BACKGROUND ART

In recent years, an organic electroluminescence (hereinafter referred to as EL) display device provided with a pixel circuit including an organic EL element as a light-emitting element has been put to practical use. In the organic EL display device, the frame frequency is sometimes switched to improve moving image quality or to reduce power consumption. For example, the moving image quality can be improved by switching the frame frequency from 60 Hz to 90 Hz. Power consumption can be reduced by switching the frame frequency from 60 Hz to 30 Hz.

In relation to the disclosure, Patent Document 1 describes an organic EL display device in which a first emission period, a black display period, and a second emission period are included within one frame period, and an area represented by the product of the length of the emission period and luminance is larger in the second emission period than in the first emission period, in order to reduce a flicker at the time of performing low-frequency drive. Patent Document 2 describes an organic electroluminescent display device that maintains a constant width of a scanning signal regardless of a change in frame frequency in order to maintain constant luminance and color coordinates even when the frame frequency changes.

CITATION LIST

Patent Documents

[Patent Document 1] Japanese Laid-Open Patent Publication No. 2018-63351

[Patent Document 2] Japanese Laid-Open Patent Publication No. 2011-59648

SUMMARY

Technical Problem

In the known organic EL display device, a display flicker may be visually recognized for a moment when the frame frequency is switched. FIG. 16 is a view illustrating a state of the known display device at the time of frame frequency switching. In FIG. 16, EMSP indicates a voltage of an emission start pulse supplied to a light-emission control line drive circuit, the data voltage indicates a voltage applied to a data line, the luminance indicates a luminance of a pixel in which the data voltage is first written within one frame period (the luminance of an organic EL element in a pixel circuit in a first row), and the average luminance indicates an average luminance of a display screen. FIG. 16 illustrates a state when the frame frequency is switched from 60 Hz to 90 Hz during the display of a monochrome image.

The organic EL elements in the pixel circuits in each row emit light during a period delayed by a predetermined time from the low-level period of the emission start pulse EMSP. For example, the organic EL element in the pixel circuit in the first row emits light during a period delayed by one horizontal period from the low-level period of the emission start pulse EMSP. When the frame frequency is 60 Hz, three emission periods are provided within one frame period. When the frame frequency is 90 Hz, two emission periods are provided within one frame period. In the known display device, the data voltage does not change when the frame frequency is switched.

In the pixel circuit in the first row, the data voltage is written near the beginning of one frame period. The luminance of the organic EL element in the pixel circuit in the first row is maximized near the beginning of one frame period and then gradually decreases. When the frame frequency is 90 Hz, the amount of decrease in the luminance of the organic EL elements in the pixel circuits in each row is smaller than that when the frame frequency is 60 Hz, and hence the average luminance is higher. The average luminance increases within the frame period immediately after the frame frequency is switched to 90 Hz and does not change thereafter. An observer visually recognizes this change in average luminance as an instantaneous display flicker.

When the frame frequency is switched higher, the time during which charge accumulated in a capacitance in the pixel circuit is released becomes shorter, so that the amount of decrease in the current flowing through the organic EL element becomes smaller. For this reason, the luminance of the pixel slightly increases (the decrease amount of the luminance decreases), and the luminance of the display screen also slightly increases. When the frame frequency is switched lower, the opposite phenomenon occurs. The observer visually recognizes a change in the luminance of the display screen as an instantaneous display flicker.

Therefore, it is an object to provide a display device that prevents a display flicker when a frame frequency is switched.

Means for Solving the Problems

The above problem can be solved by, for example, a display device having a function of switching a frame frequency, the display device including: a display portion that includes a plurality of scanning lines, a plurality of data lines, and a plurality of pixel circuits; a scanning line drive circuit configured to drive the scanning lines; and a data line drive circuit configured to drive the data lines. A level of a data voltage applied to each of the data lines changes in accordance with the frame frequency.

The above problem can also be solved by a display device having a function of switching a frame frequency, the display device including: a display portion that includes a plurality of scanning lines, a plurality of data lines, and a plurality of pixel circuits; a scanning line drive circuit configured to drive the scanning lines; and a data line drive circuit configured to drive the data lines. A timing of a control signal used to drive the display portion changes in accordance with the frame frequency to cause a length of a charging period of each of the pixel circuits to change in accordance with the frame frequency.

The above problem can also be solved by a method for driving a display device performed by these display devices.

Effects of the Disclosure

According to the above display device and the above method for driving a display device, the level of the data voltage (or the length of the charging period of each of the pixel circuits) changes in accordance with the frame frequency, and therefore it is possible to cancel the change in the luminance of the display screen when the frame frequency is switched and prevent a display flicker when the frame frequency is switched.

DESCRIPTION OF EMBODIMENTS

First Embodiment

Figure 1:
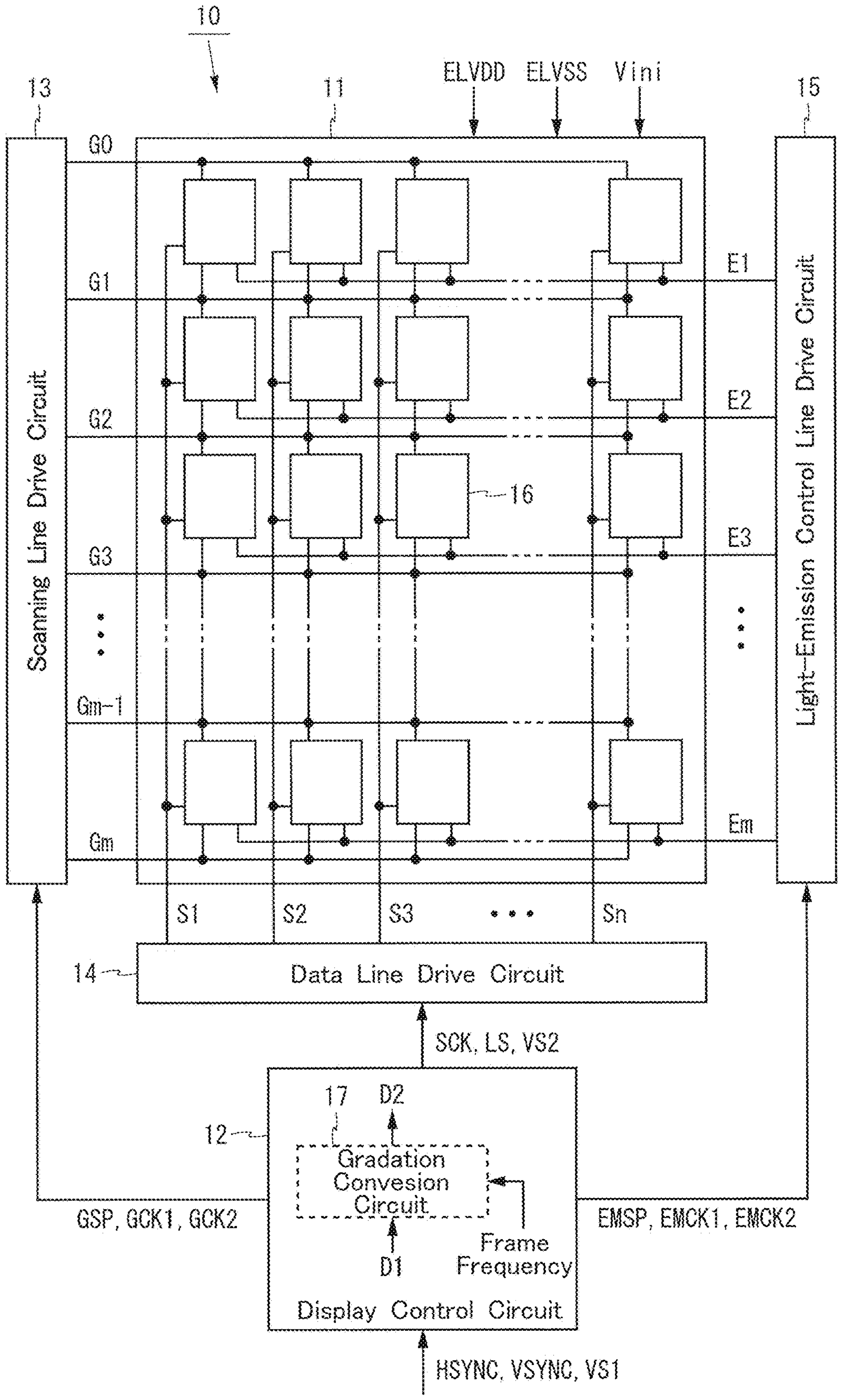
FIG. 1 is a block diagram illustrating a configuration of a display device according to a first embodiment.

FIG. 1 is a block diagram illustrating a configuration of a display device according to a first embodiment. A display device 10 illustrated in FIG. 1 is an organic EL display device provided with a display portion 11, a display control circuit 12, a scanning line drive circuit 13, a data line drive circuit 14, and a light-emission control line drive circuit 15. The display control circuit 12 includes a gradation conversion circuit 17 that performs gradation conversion on a video signal in accordance with a frame frequency. Hereinafter, m and n are integers of 2 or more, i is an integer of 1 or more and m or less, and j is an integer of 1 or more and n or less.

The display portion 11 includes (m+1) scanning lines G0 to Gm, n data lines S1 to Sn, m light-emission control lines E1 to Em, and (m×n) pixel circuits 16. The scanning lines G0 to Gm extend in the row direction and are arranged in parallel to each other. The data lines S1 to Sn extend in the column direction and are arranged in parallel to each other so as to be orthogonal to the scanning lines G1 to Gm. The light-emission control lines E1 to Em extend in the row direction and are arranged in parallel with the scanning lines G0 to Gm. The scanning lines G1 to Gm and the data lines S1 to Sn intersect at (m×n) locations. The (m×n) pixel circuits 16 are two-dimensionally arranged corresponding to the intersections of the scanning lines G1 to Gm and the data lines S1 to Sn. A high-level power supply voltage ELVDD, a low-level power supply voltage ELVSS, and an initialization voltage Vini are supplied to each pixel circuit 16 using a conductive member (wiring or electrode) (not illustrated).

A horizontal synchronization signal HSYNC, a vertical synchronization signal VSYNC, and a video signal VS1 are input to the display control circuit 12 from the outside of the display device 10. Based on these signals, the display control circuit 12 outputs a control signal to each of the scanning line drive circuit 13 and the light-emission control line drive circuit 15, and outputs a control signal and a video signal VS2 to the data line drive circuit 14. The control signal output to the scanning line drive circuit 13 includes a gate start pulse GSP and two-phase gate clocks GCK1, GCK2. The control signal output to the data line drive circuit 14 includes a source clock SCK and a latch strobe signal LS. The control signal output to the light-emission control line drive circuit 15 includes an emission start pulse EMSP and two-phase emission clocks EMCK1, EMCK2.

The scanning line drive circuit 13 drives the scanning lines G0 to Gm based on the gate start pulse GSP and the gate clocks GCK1, GCK2. The data line drive circuit 14 drives the data lines S1 to Sn based on the source clock SCK, the latch strobe signal LS, and the video signal VS2. The light-emission control line drive circuit 15 drives the light-emission control lines E1 to Em based on the emission start pulse EMSP and the emission clocks EMCK1, EMCK2.

More specifically, the scanning line drive circuit 13 sequentially selects one scanning line from among the scanning lines G0 to Gm based on the gate start pulse GSP and the gate clocks GCK1, GCK2, and applies a selection voltage (here, a low-level voltage) to the selected scanning line. Thereby, the n pixel circuits 16 connected to the selected scanning line are selected collectively. The data line drive circuit 14 sequentially takes in the video signal VS2 according to the source clock SCK. According to the latch strobe signal LS, the data line drive circuit 14 applies n data voltages corresponding to the captured video signal VS2 to the data lines S1 to Sn, respectively. Thereby, the n data voltages are written to the selected n pixel circuits 16, respectively.

An emission period and a non-emission period are assigned to the pixel circuits 16 in each row. Based on the emission start pulse EMSP and the emission clocks EMCK1, EMCK2, the light-emission control line drive circuit 15 applies a light emission voltage (here, a low-level voltage) to the light-emission control line Ei during the emission period of pixel circuits 16 in an ith row, and applies a non-light emission voltage (here, a high-level voltage) to the light-emission control line Ei during the non-emission period of the pixel circuits 16 in the ith row. During the emission period of the pixel circuits 16 in the ith row, the organic EL element in each pixel circuit 16 in the ith row emits light with luminance corresponding to the data voltage written in the each pixel circuit 16.

Figure 2:
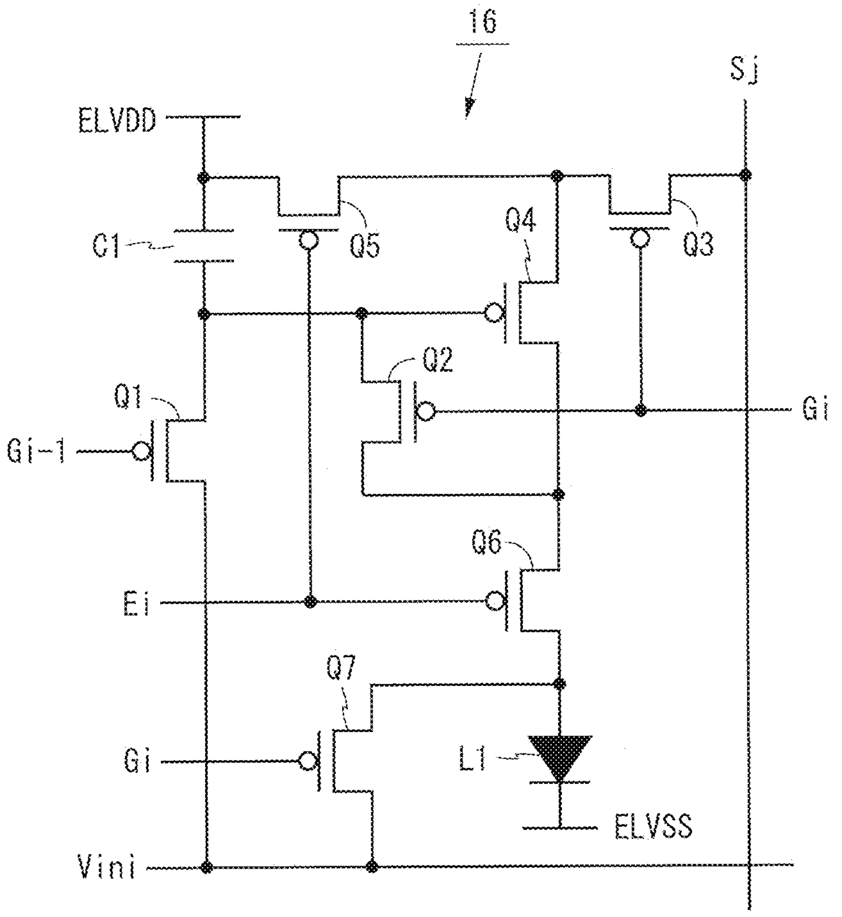
FIG. 2 is a circuit diagram of a pixel circuit of the display device illustrated in FIG. 1.

FIG. 2 is a circuit diagram of the pixel circuit 16. FIG. 2 illustrates a pixel circuit 16 in an ith row and a jth column. The pixel circuit 16 illustrated in FIG. 2 includes seven thin film transistors (hereinafter referred to as TFT) Q1 to Q7, an organic EL element L1, and a capacitor C1. TFTs Q1 to Q7 are P-channel transistors. The pixel circuit 16 is connected to scanning lines G(i-1), Gi, a data line Sj, and a light-emission control line Ei. The scanning line G(i-1) is selected one horizontal period before the scanning line Gi.

Note that the TFT included in the pixel circuit 16 may be an amorphous silicon transistor having a channel layer formed of amorphous silicon, a low-temperature polysilicon transistor having a channel layer formed of low-temperature polysilicon, or an oxide semiconductor transistor having a channel layer formed of an oxide semiconductor. For example, indium-gallium-zinc oxide (referred to as IGZO) may be used for the oxide semiconductor. The TFT included in the pixel circuit 16 may be a top gate type or a bottom gate type. Instead of the pixel circuit 16 including the P-channel transistor, a pixel circuit including an N-channel transistor may be used. When a pixel circuit is configured using the N-channel transistor, the polarities of the signal supplied to the pixel circuit and the power supply voltage may be inverted.

The high-level power supply voltage ELVDD is applied to the source terminal of the TFT Q5 and one electrode (the upper electrode in FIG. 2) of the capacitor C1. One conductive terminal (the right conductive terminal in FIG. 2) of the TFT Q3 is connected to the data line Sj. The drain terminal of the TFT Q5 and the other conductive terminal of the TFT Q3 are connected to the source terminal of the TFT Q4. The drain terminal of the TFT Q4 is connected to one conductive terminal (the lower conductive terminal in FIG. 2) of the TFT Q2 and the source terminal of the TFT Q6. The drain terminal of the TFT Q6 is connected to the anode terminal of the organic EL element L1 and the source terminal of the TFT Q7. The low-level power supply voltage ELVSS is applied to the cathode terminal of the organic EL element L1. The other conductive terminal of the TFT Q2 is connected to the gate terminal of the TFT Q4, the other electrode of the capacitor C1, and the source terminal of the TFT Q1. The initialization voltage Vini is applied to the drain terminals of the TFTs Q1, Q7. The gate terminal of the TFT Q1 is connected to the scanning line G(i-1), the gate terminals of the TFTs Q2, Q3, Q7 are connected to the scanning line Gi, and the gate terminals of the TFTs Q5, Q6 are connected to the light-emission control line Ei.

Figure 3:
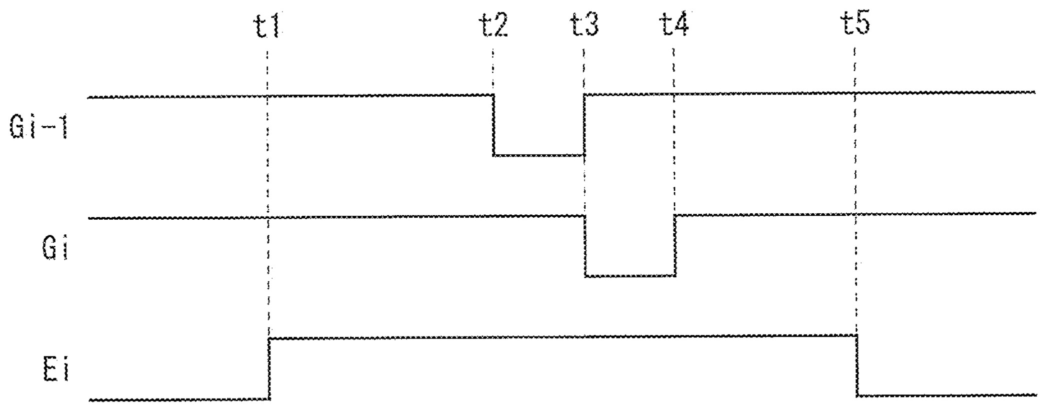
FIG. 3 is a timing chart of the pixel circuit illustrated in FIG. 2.

FIG. 3 is a timing chart of the pixel circuit 16. Before time t1, the voltages of the scanning lines G(i-1), Gi are at a high level, and the voltage of the light-emission control line Ei is at a low level. Therefore, TFTs Q1 to Q3, Q7 are in an off state, and TFTs Q5, Q6 are in an on state. At this time, when the gate-source voltage of the TFT Q4 is equal to or lower than the threshold voltage of the TFT Q4, a current flows from the conductive member having the high-level power supply voltage ELVDD toward the conductive member having the low-level power supply voltage ELVSS via the TFT Q5, Q4, Q6 and the organic EL element L1, and the organic EL element L1 emits light with luminance corresponding to the amount of the flowing current.

Next, at time t1, the voltage of the light-emission control line Ei changes to the high level. Accordingly, the TFTs Q5, Q6 are turned off. Since the TFTs Q5, Q6 are turned off, after time t1, the current passing through the organic EL element L1 does not flow, and the organic EL element L1 does not emit light.

At time t2, the voltage of the scanning line G(i-1) changes to the low level. Accordingly, the TFT Q1 is turned on. Since the TFT Q1 is turned on, the gate voltage of the TFT Q4 becomes equal to the initialization voltage Vini. The initialization voltage Vini is set to the low level, at which the TFT Q4 is turned on, immediately after the voltage of the scanning line Gi changes to the low level (immediately after time t3).

Next, at time t3, the voltage of the scanning line G(i-1) changes to the high level, and the voltage of the scanning line Gi changes to the low level. Accordingly, the TFT Q1 is turned off, and the TFTs Q2, Q3, Q7 are turned on. Since the TFT Q7 is turned on, the voltage of the anode terminal of the organic EL element L1 becomes equal to the initialization voltage Vini. Since the TFT Q2 is turned on, the TFT Q4 is diode-connected. Therefore, a current passing through the TFTs Q3, Q4, Q2 flows from the data line Sj toward the gate terminal of the TFT Q4, and the gate voltage of the TFT Q4 increases. When the gate-source voltage of the TFT Q4 becomes equal to the threshold voltage of the TFT Q4, the current does not flow. When the threshold voltage of the TFT Q4 is Vth (<0) and the data voltage applied to the data line Sj from time t3 to time t4 is Vd, the gate voltage of the TFT Q4 immediately before time t4 is (Vd−|Vth|).

Next, at time t4, the voltage of the scanning line Gi changes to the high level. Accordingly, the TFTs Q2, Q3, Q7 are turned off. After time t4, the capacitor C1 holds the voltage between the electrodes (ELVDD−Vd+|Vth|).

Next, at time t5, the voltage of the light-emission control line Ei changes to the low level. Accordingly, the TFTs Q5, Q6 are turned on. After time t5, the current flows from the conductive member having the high-level power supply voltage ELVDD to the conductive member having the low-level power supply voltage ELVSS via the TFTs Q5, Q4, Q6 and the organic EL element L1. A gate-source voltage Vgs of the TFT Q4 is maintained at (ELVDD−Vd+|Vth|) by the action of the capacitor C1. Therefore, a current Id flowing through the organic EL element L1 after time t5 is given by the following Formula (1) using a constant K.

$$
\begin{aligned}
Id &= K(Vgs - |Vth|)^2 \\
&= K(ELVDD - Vd + |Vth| - Vth|)^2 \\
&= K(ELVDD - Vd)^2
\end{aligned} \tag{1}
$$

After time t5, the organic EL element L1 emits light with luminance corresponding to the data voltage Vd written in the pixel circuit 16 regardless of the threshold voltage Vth of the TFT Q4.

The display device 10 has a function of switching the frame frequency to 15 Hz, 30 Hz, 60 Hz, 90 Hz, or the like. One frame period includes a number of emission periods of the organic EL elements L1 in the pixel circuits 16 in each row, the number of emission periods corresponding to the frame frequency. When the frame frequency is 15 Hz, 12 emission periods are provided within one frame period. When the frame frequency is 30 Hz, six emission periods are provided within one frame period. When the frame frequency is 60 Hz, three emission periods are provided within one frame period. When the frame frequency is 90 Hz, two emission periods are provided within one frame period.

The display control circuit 12 includes a gradation conversion circuit 17 that performs gradation conversion on the video signal VS1 in accordance with the frame frequency. The gradation conversion circuit 17 converts gradation data included in the video signal VS1 (hereinafter referred to as an input gradation D1) into gradation data included in the video signal VS2 (hereinafter referred to as an output gradation D2). The data line drive circuit 14 generates data voltages to be applied to data lines S1 to Sn based on video signal VS2 after the gradation conversion.

Figure 4:
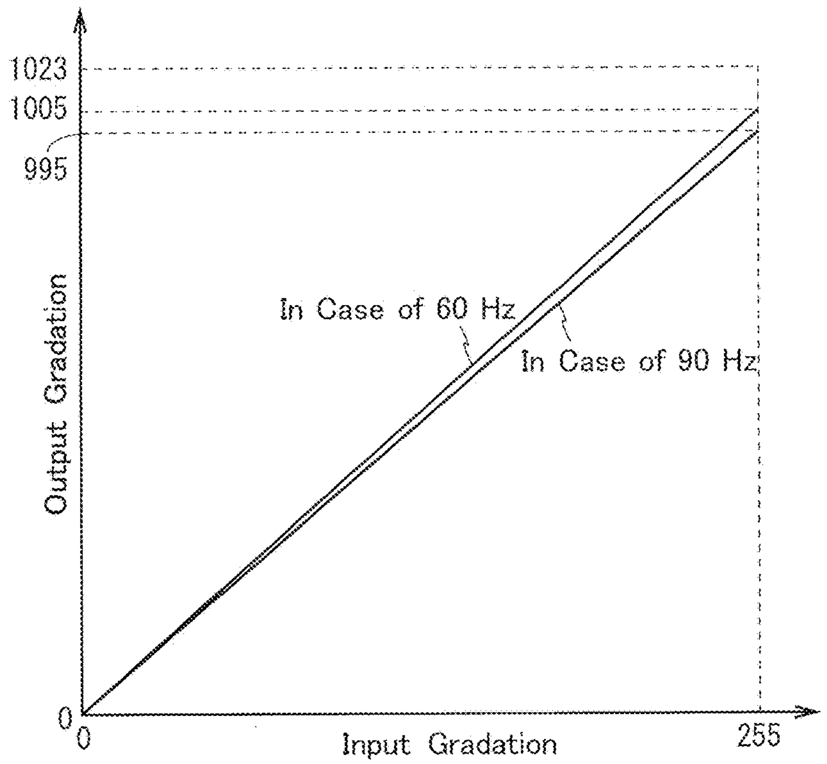
FIG. 4 is a diagram illustrating characteristics of a gradation conversion circuit of the display device illustrated in FIG. 1.

FIG. 4 is a diagram illustrating the characteristics of the gradation conversion circuit 17. Hereinafter, it is assumed that the input gradation D1 takes a value of 0 or more and 255 or less, and the output gradation D2 takes a value of 0 or more and 1023 or less. FIG. 4 illustrates, as an example, characteristics when the frame frequency is 60 Hz and characteristics when the frame frequency is 90 Hz. As illustrated in FIG. 4, the output gradation D2 is proportional to the input gradation D1. When the frame frequency is 60 Hz, the output gradation corresponding to an input gradation of 255 is 1005. When the frame frequency is 90 Hz, the output gradation corresponding to the input gradation of 255 is 995. Output gradations corresponding to other input gradations are obtained in a similar manner.

Figure 5:
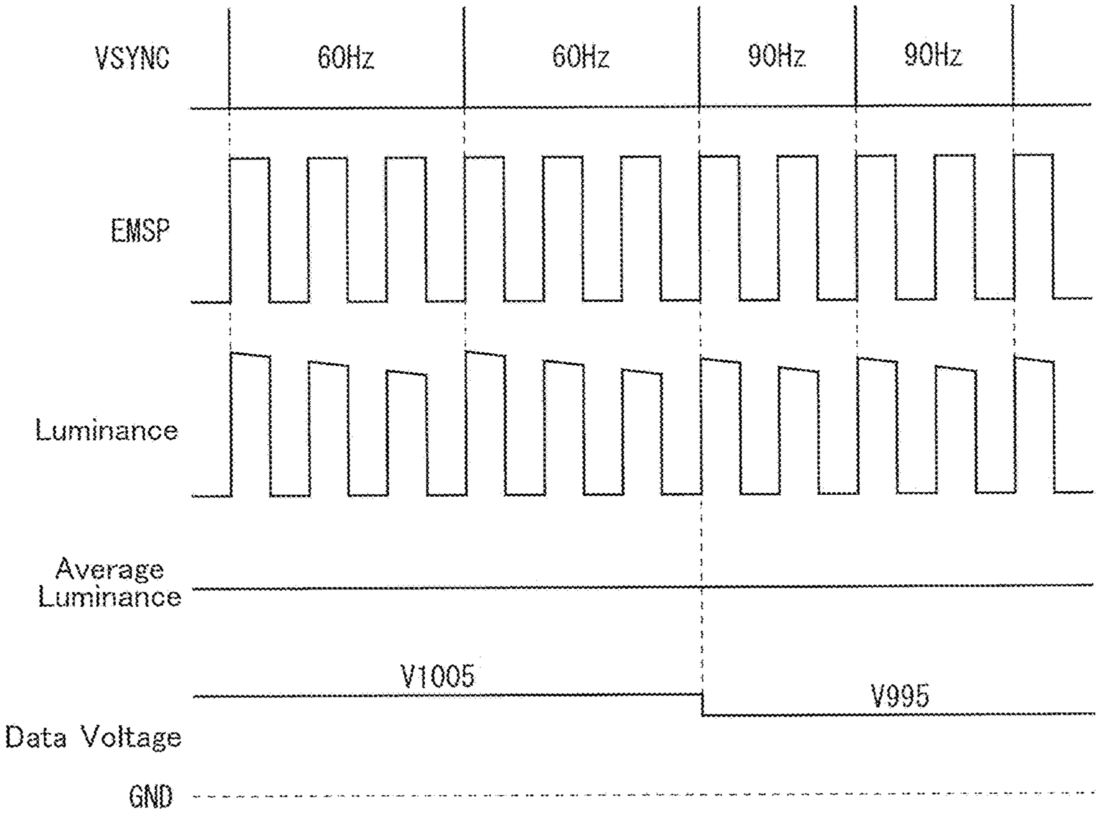
FIG. 5 is a diagram illustrating an operation of the display device illustrated in FIG. 1 at the time of frame frequency switching.
Figure 16:
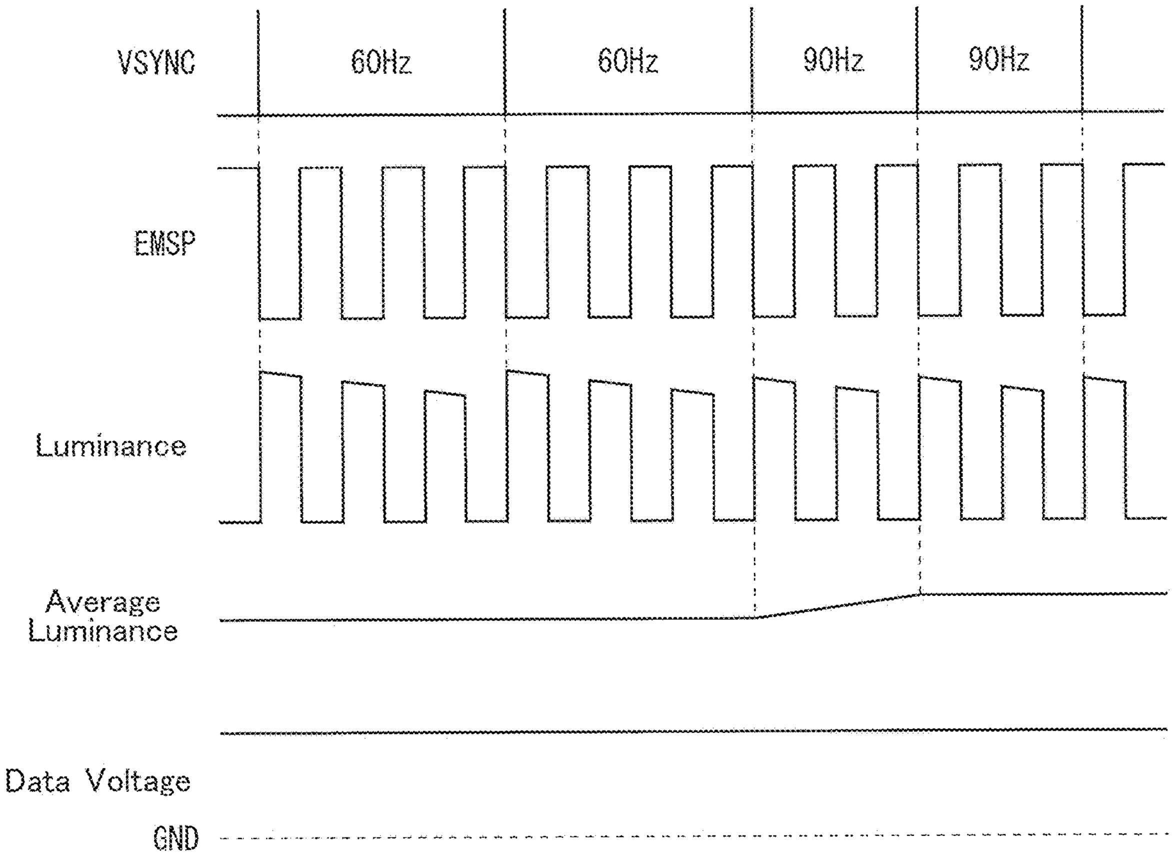
FIG. 16 is a diagram illustrating an operation of a known display device at the time of frame frequency switching.

FIG. 5 is a diagram illustrating a state of the display device 10 at the time of frame frequency switching. Similarly to FIG. 16, FIG. 5 illustrates a state when the frame frequency is switched from 60 Hz to 90 Hz during the display of a monochrome image. In the example illustrated in FIG. 5, the input gradation D1 is 255. When the frame frequency is 60 Hz, the gradation conversion circuit 17 converts the input gradation of 255 into an output gradation of 1005. The data voltage at this time is a voltage of V1005 corresponding to the output gradation of 1005. When the frame frequency is 90 Hz, the gradation conversion circuit 17 converts the input gradation of 255 into an output gradation of 995. The data voltage at this time is a voltage of V995 corresponding to the output gradation of 995. In this way, when the frame frequency is switched from 60 Hz to 90 Hz, the level of the data voltage decreases. Conversely, when the frame frequency is switched from 90 Hz to 60 Hz, the level of the data voltage increases.

As described above, in the known display device, the luminance of the display screen slightly increases when the frame frequency is switched higher, and slightly decreases when the frame frequency is switched lower. The observer visually recognizes a change in the luminance of the display screen as an instantaneous display flicker.

In order to solve this problem, the display device 10 is provided with the gradation conversion circuit 17 that performs gradation conversion on the video signal VS1 in accordance with the frame frequency. When the frame frequency is switched higher, the gradation conversion circuit 17 decreases the output gradation D2 so as to cancel an increase in the luminance of the display screen. Hence the data voltage decreases so as to cancel the increase in the luminance of the display screen. For example, when the luminance at the frame frequency of 90 Hz is 1% higher than the luminance at the frame frequency of 60 Hz, the data voltage decreases so that the luminance becomes 1% lower. On the other hand, when the frame frequency is switched lower, the gradation conversion circuit 17 increases the output gradation D2 so as to cancel a decrease in the luminance of the display screen. Hence the data voltage increases so as to cancel the decrease in the luminance of the display screen. Therefore, according to the display device 10, it is possible to prevent a display flicker when the frame frequency is switched.

In FIG. 4, the output gradation D2 is proportional to the input gradation D1, but the output gradation D2 may not necessarily be proportional to the input gradation D1. When the gradation conversion circuit 17 has a nonlinear characteristic, the gradation conversion circuit 17 may include a table storing a relationship between the input gradation D1 and the output gradation D2 and perform gradation conversion with reference to the table. The table may store output gradations D2 corresponding to all input gradations D1 or may store only output gradations D2 corresponding to a plurality of representative input gradations D1. In the latter case, when the input gradation D1 is provided, the gradation conversion circuit 17 may obtain two output gradations corresponding to two representative gradations close to the input gradation D1 by referring to the table and perform an interpolation operation on the obtained two output gradations to obtain the output gradation D2.

As described above, the display device 10 according to the present embodiment is provided with: the display portion 11 including the plurality of scanning lines G0 to Gm, the plurality of data lines S1 to Sn, and the plurality of pixel circuits 16; the scanning line drive circuit 13 that drives the scanning lines G0 to Gm; and the data line drive circuit 14 that drives the data lines S1 to Sn, and has a function of switching the frame frequency. In the display device 10, the level of the data voltage applied to the data lines S1 to Sn changes in accordance with the frame frequency. The level of the data voltage decreases when the frame frequency is switched higher, and increases when the frame frequency is switched lower. The display device 10 includes the gradation conversion circuit 17 that performs gradation conversion on the video signal VS1 in accordance with the frame frequency, and the data line drive circuit 14 generates a data voltage based on the video signal VS2 after gradation conversion.

According to the display device 10 of the present embodiment, the level of the data voltage changes in accordance with the frame frequency, so that it is possible to cancel the change in the luminance of the screen due to the switching of the frame frequency and to prevent a display flicker when the frame frequency is switched.

Figure 6:
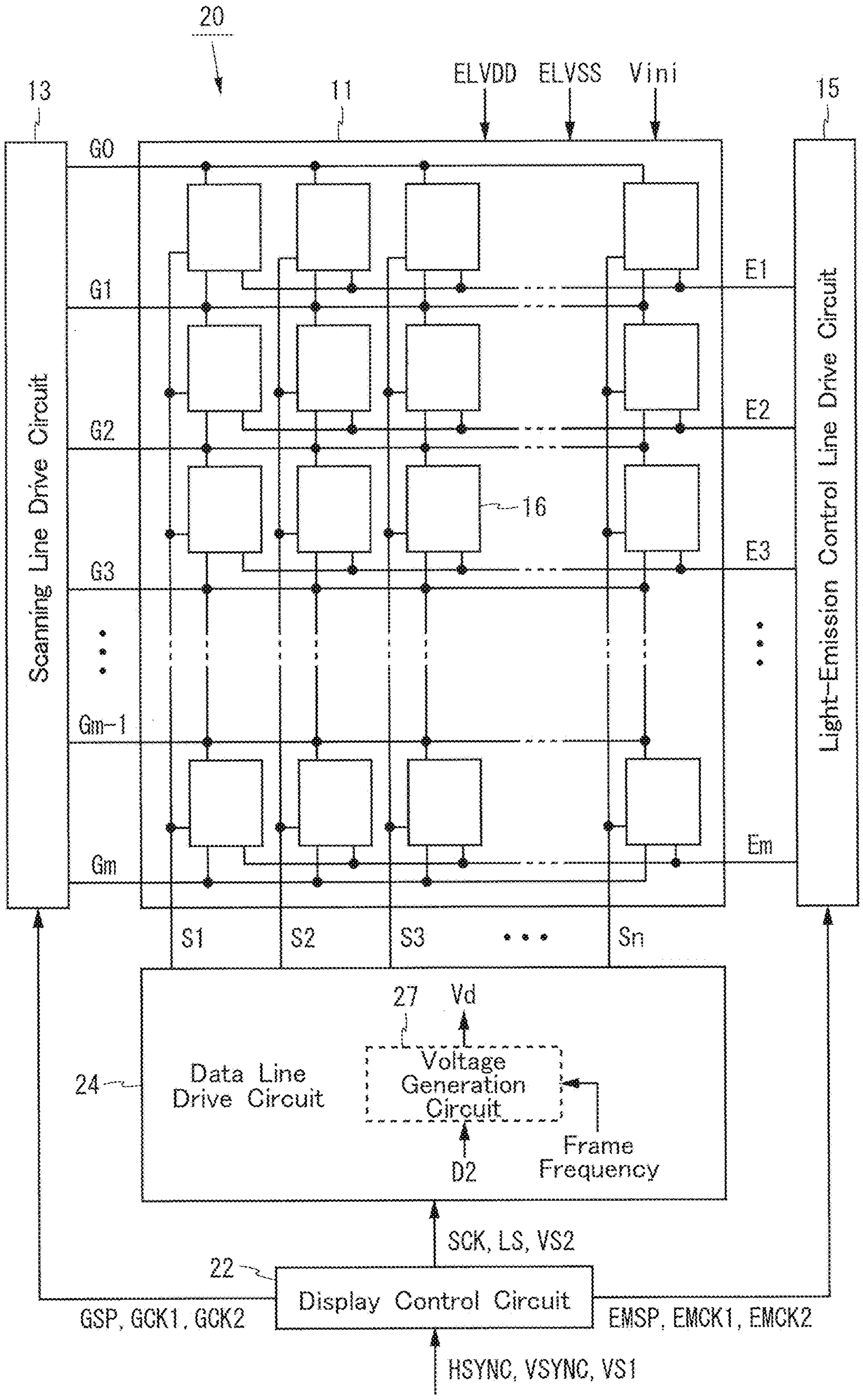
FIG. 6 is a block diagram illustrating a configuration of a display device according to a modification of the first embodiment.

The display device according to the present embodiment can form the following modification. FIG. 6 is a block diagram illustrating a configuration of a display device according to a modification of the first embodiment. A display device 20 illustrated in FIG. 6 is obtained by replacing the display control circuit 12 and the data line drive circuit 14 in the display device 10 with a display control circuit 22 and a data line drive circuit 24, respectively. The data line drive circuit 24 includes a voltage generation circuit 27 that generates the data voltage Vd to be applied to the data lines S1 to Sn based on gradation data (output gradation D2), included in the video signal VS2 output from the display control circuit 22, and a frame frequency. The voltage generation circuit 27 selects the highest voltage corresponding to the frame frequency from among a plurality of highest voltages provided and performs resistance division on the selected highest voltage to generate the data voltage Vd.

In the display device 20 of the modification, the data line drive circuit 24 includes the voltage generation circuit 27 for generating the data voltage Vd that changes in accordance with the frame frequency based on the video signal VS2. Thereby, similarly to the display device 10, the level of the data voltage Vd can be changed in accordance with the frame frequency to prevent a display flicker when the frame frequency is switched.

Second Embodiment

The display device according to the second embodiment has the same configuration (FIG. 1) as the display device 10 according to the first embodiment. In the display device 10 according to the first embodiment, the data voltage decreases, for example, when the frame frequency is switched from 60 Hz to 90 Hz. However, depending on the correction method, the smoothness of the gradation display may be impaired due to the correction.

Therefore, in order to prevent a display flicker without impairing the smoothness of the gradation display, in the display device according to the present embodiment, the data voltage changes when the frame frequency is switched, and returns to its initial level over a plurality of frame periods. Hereinafter, as an example, a case will be described where the data voltage, which was lowered when the frame frequency was switched from 60 Hz to 90 Hz, is returned to its initial level over three frame periods. A frame period immediately after the frame frequency is switched to 90 Hz is referred to as a first frame period, the next frame period thereafter is referred to as a second frame period, and the next frame period thereafter is referred to as a third frame period.

Figure 7:
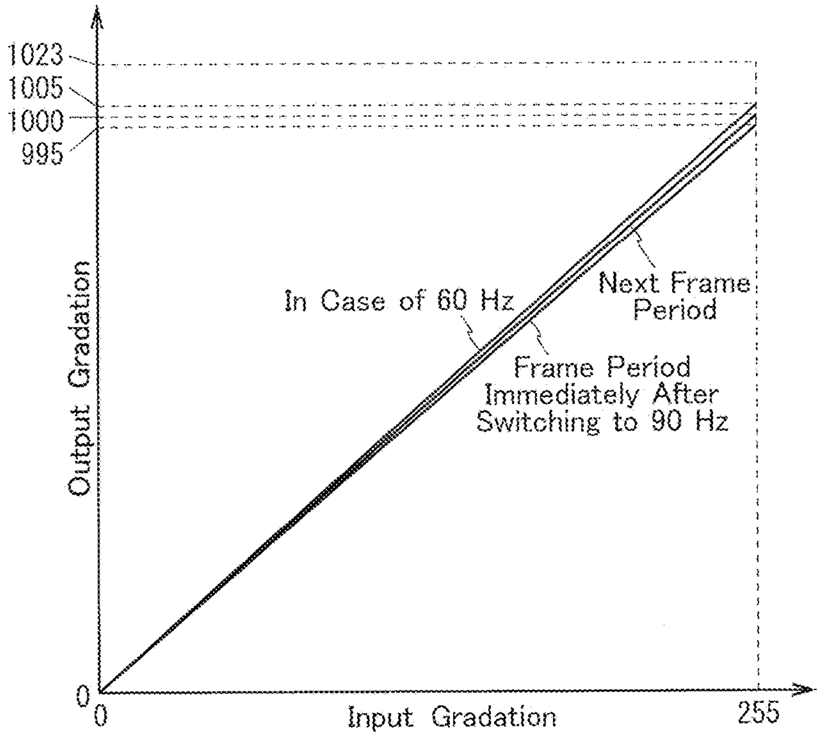
FIG. 7 is a diagram illustrating characteristics of a gradation conversion circuit of a display device according to a second embodiment.

FIG. 7 is a diagram illustrating the characteristics of the gradation conversion circuit of the display device according to the present embodiment. FIG. 7 illustrates, as an example, a characteristic when the frame frequency is 60 Hz, a characteristic in the first frame period (the frame period immediately after switching to 90 Hz), and a characteristic in the second frame period (the next frame period thereafter). The characteristic in the third frame period is the same as the characteristic when the frame frequency is 60 Hz.

As illustrated in FIG. 7, the output gradation D2 is proportional to the input gradation D1. When the frame frequency is 60 Hz and in the third frame period, the output gradation corresponding to the input gradation of 255 is 1005. In the first frame period, the output gradation corresponding to the input gradation of 255 is 995. In the second frame period, the output gradation corresponding to the input gradation of 255 is 1000. Output gradations corresponding to other input gradations are obtained in a similar manner.

Figure 8:
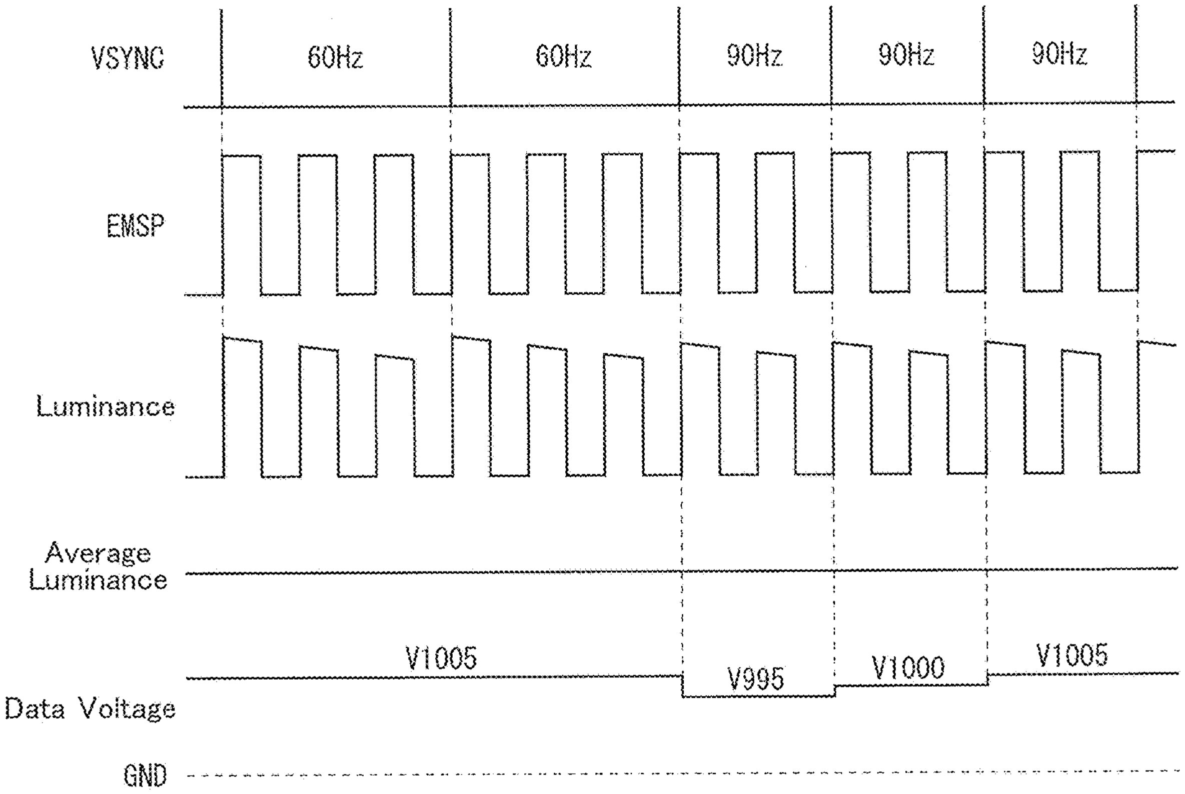
FIG. 8 is a diagram illustrating an operation of the display device according to the second embodiment at the time of frame frequency switching.

FIG. 8 is a diagram illustrating a state of the display device according to the present embodiment at the time of frame frequency switching. Similarly to FIGS. 5 and 16, FIG. 8 illustrates a state when the frame frequency is switched from 60 Hz to 90 Hz during the display of a monochrome image. In the example illustrated in FIG. 8, the input gradation D1 is 255. When the frame frequency is 60 Hz, the gradation conversion circuit according to the present embodiment converts the input gradation of 255 into an output gradation of 1005. The data voltage at this time is a voltage of V1005 corresponding to the output gradation of 1005. In the first frame period, the gradation conversion circuit according to the present embodiment converts the input gradation of 255 into an output gradation of 995. The data voltage at this time is a voltage of V995 corresponding to the output gradation of 995. In the second frame period, the gradation conversion circuit according to the present embodiment converts the input gradation of 255 into an output gradation of 1000. The data voltage at this time is a voltage of V1000 corresponding to the output gradation of 1000. In the third frame period, the gradation conversion circuit according to the present embodiment converts the input gradation of 255 into an output gradation of 1005. The data voltage at this time is a voltage of V1005 corresponding to the output gradation of 1005. In this example, the data voltage decreases when the frame frequency is switched from 60 Hz to 90 Hz and returns to its initial level over three frame periods.

When the data voltage is changed in accordance with the frame frequency, it is necessary to increase the amount of change in the data voltage when the amount of change in the frame frequency is large. However, when the data voltage is greatly changed (e.g., when a change is made from a voltage of V1000 corresponding to an output gradation of 1000 to a voltage of V900 corresponding to an output gradation of 900), gradation collapse may occur on the display screen, and the smoothness of the gradation display may be impaired.

In the display device according to the present embodiment, the level of the data voltage changes when the frame frequency is switched, and returns to its initial level over a plurality of frame periods. Therefore, according to the display device according to the present embodiment, a display flicker can be prevented without impairing the smoothness of the gradation display.

Third Embodiment

Figure 9:
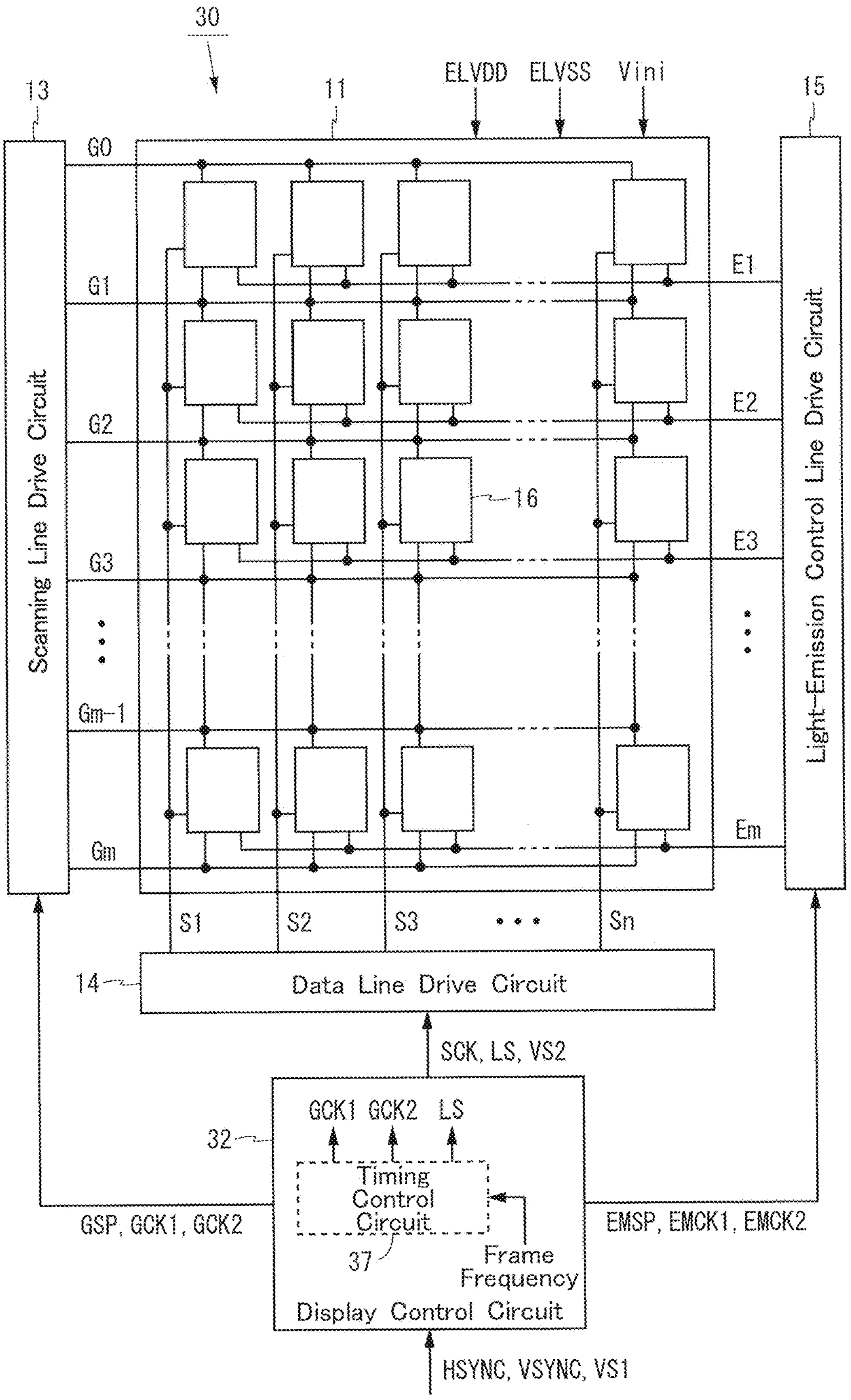
FIG. 9 is a block diagram illustrating a configuration of a display device according to a third embodiment.

FIG. 9 is a block diagram illustrating a configuration of a display device according to a third embodiment. A display device 30 illustrated in FIG. 9 is obtained by replacing the display control circuit 12 with a display control circuit 32 in the display device (FIG. 1) according to the first embodiment. The display control circuit 32 includes a timing control circuit 37. The timing control circuit 37 changes the timing of the control signal output from the display control circuit 32 in accordance with the frame frequency.

The control signal output from the display control circuit 32 includes a control signal related to the drive of the scanning line and a control signal related to the drive of the data line. The display device 30 has a configuration in which the timing of the control signal related to the drive of the scanning line changes in accordance with the frame frequency and a configuration in which the timing of the control signal related to the drive of the data line changes in accordance with the frame frequency. Hereinafter, the former is referred to as a first example, and the latter is referred to as a second example.

Figure 10:
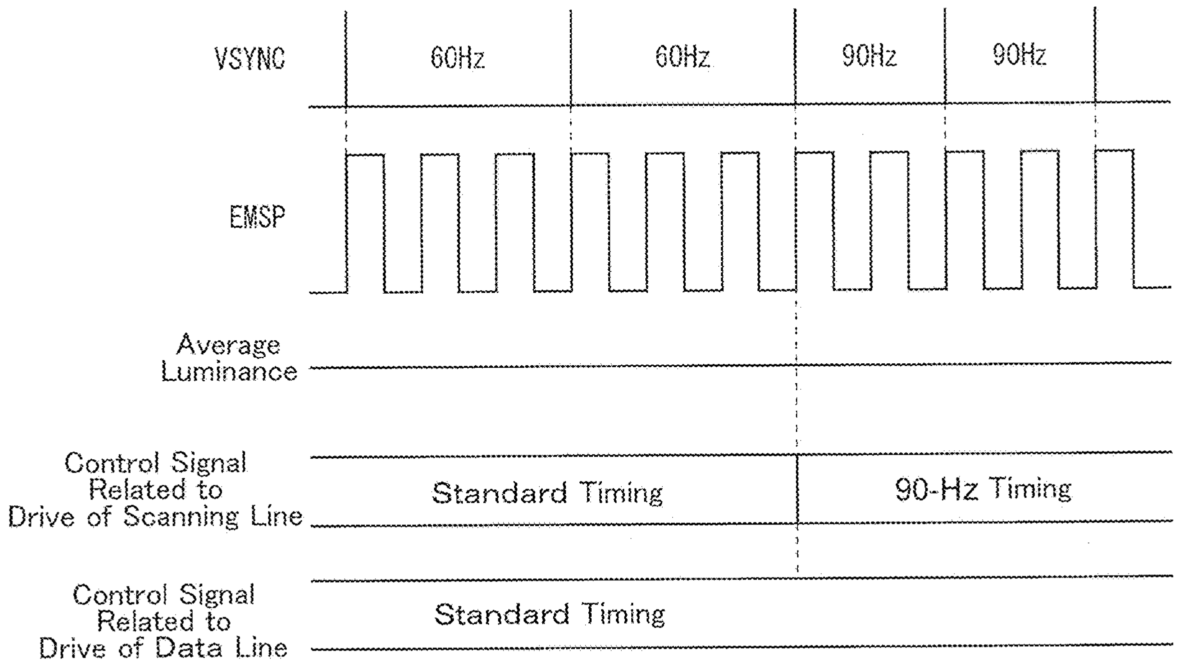
FIG. 10 is a diagram illustrating an operation of a display device according to a first example of the third embodiment at the time of frame frequency switching.

FIG. 10 is a diagram illustrating a state of the display device 30 according to the first example at the time of frame frequency switching. In the display device 30 according to the first example, when the frame frequency is 60 Hz, each of the control signal related to the drive of the scanning line and the control signal related to the drive of the data line changes according to a standard timing. When the frame frequency is 90 Hz, the control signal related to the drive of the data line changes according to the standard timing, and the control signal related to the drive of the scanning line changes according to a 90-Hz timing.

Figure 11:
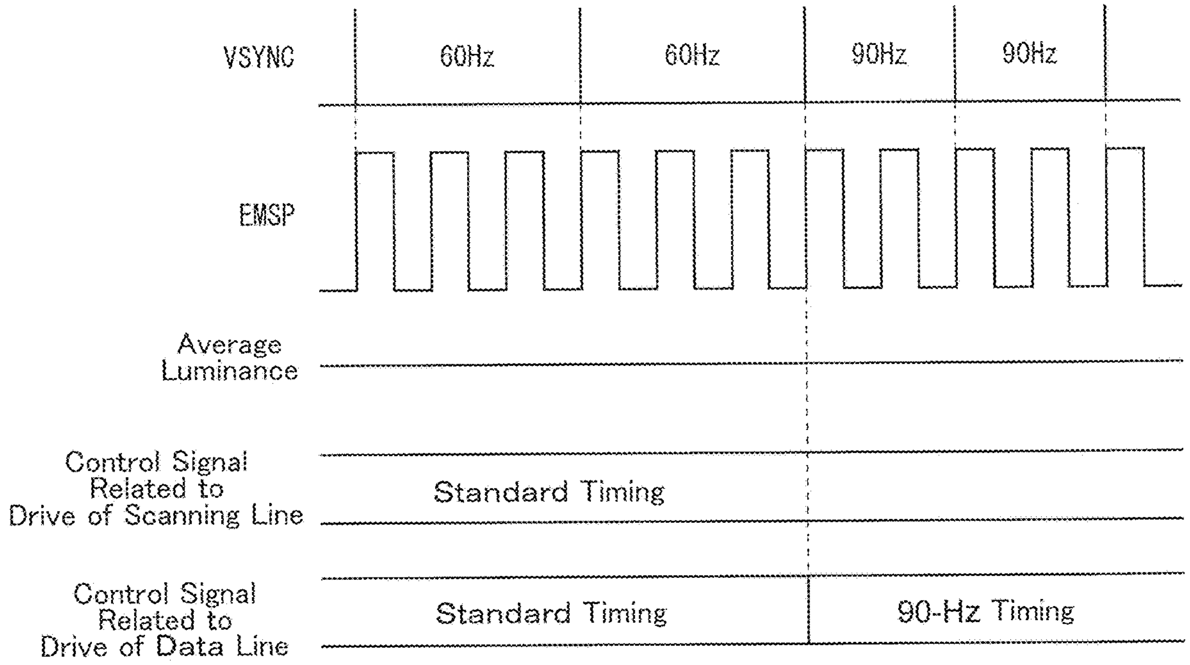
FIG. 11 is a diagram illustrating an operation of a display device according to a second example of the third embodiment at the time of frame frequency switching.

FIG. 11 is a diagram illustrating a state of the display device 30 according to the second example at the time of frame frequency switching. Also, in the display device 30 according to the second example, when the frame frequency is 60 Hz, each of the control signal related to the drive of the scanning lines and the control signal related to the drive of the data lines changes according to the standard timing. When the frame frequency is 90 Hz, the control signal related to the drive of the scanning line changes according to the standard timing, and the control signal related to the drive of the data line changes according to the 90-Hz timing.

Figure 12:
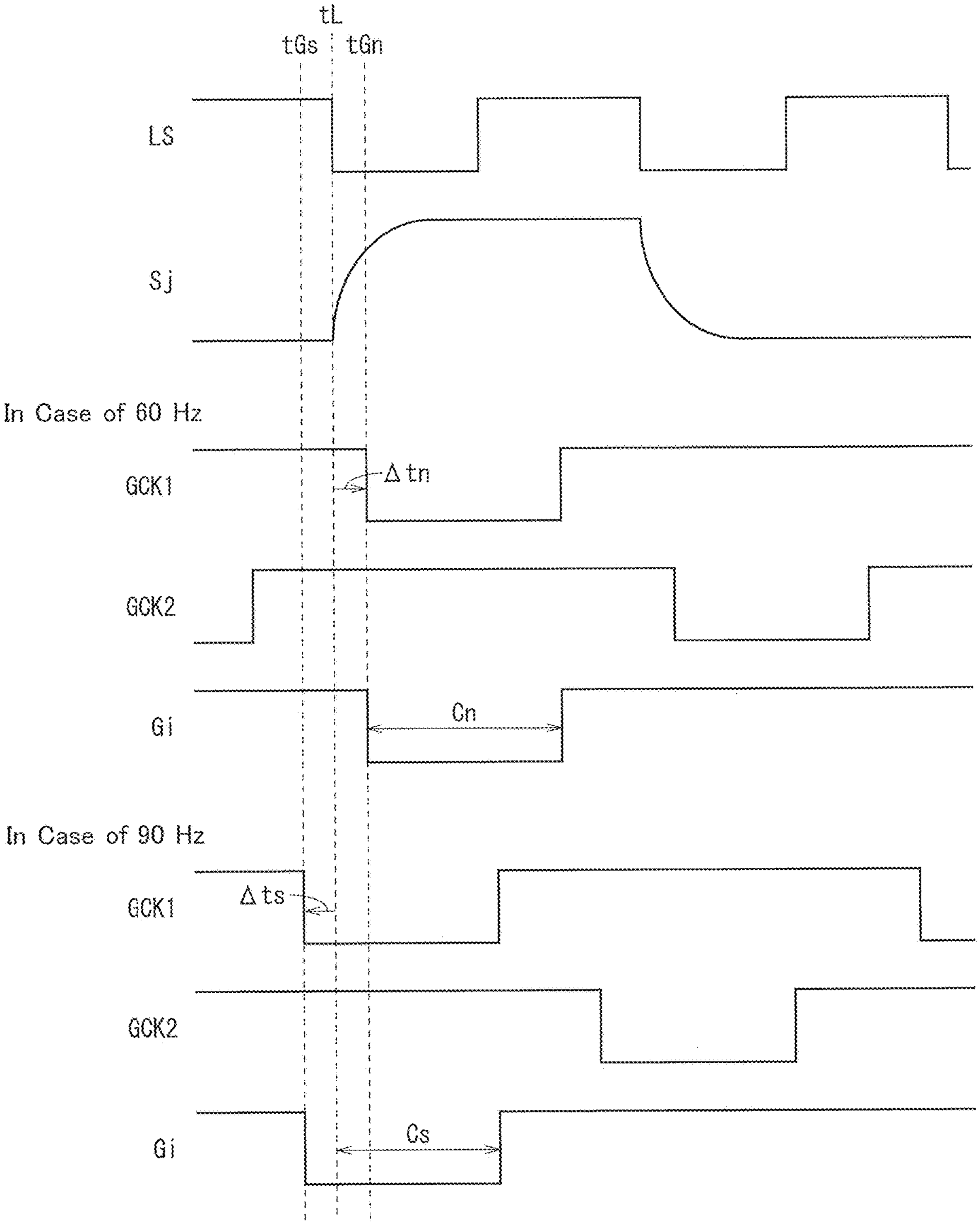
FIG. 12 is a timing chart of the display device according to the first example of the third embodiment.
Figure 13:
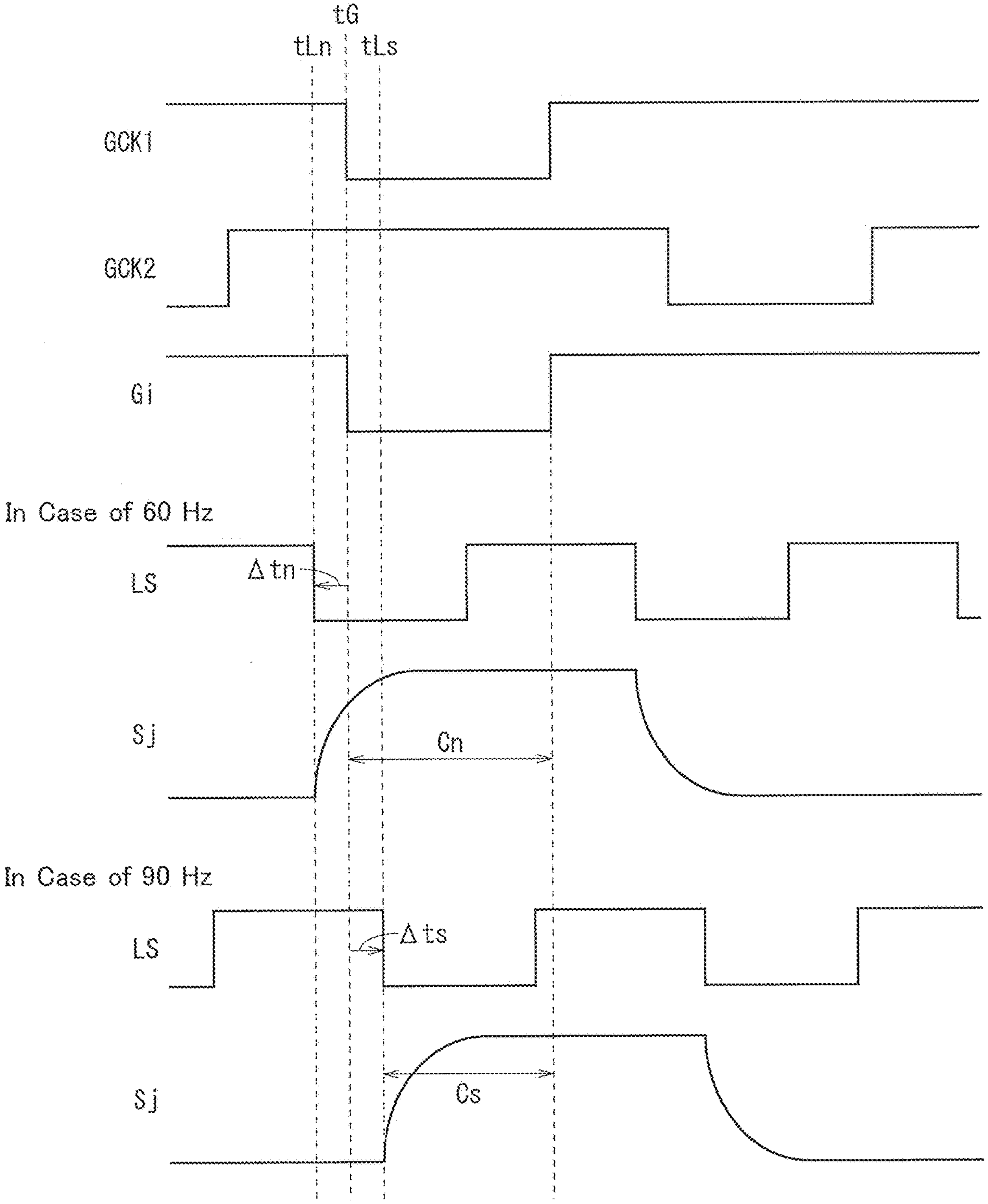
FIG. 13 is a timing chart of the display device according to the second example of the third embodiment.

FIG. 12 is a timing chart of the display device 30 according to the first example. In the first example, the focus is directed to gate clocks GCK1, GCK2 as the control signals related to the drive of the scanning lines. FIG. 13 is a timing chart of the display device 30 according to the second example. In the second example, the focus is directed to the latch strobe signal LS indicating the timing to start applying the voltage to the data line as the control signal related to the drive of the data line.

As illustrated in FIGS. 12 and 13, the voltage of the scanning line Gi changes at the same timing as the gate clock GCK1. The voltage of the data line Sj starts changing at the falling edge of the latch strobe signal LS. The charging period of the pixel circuit 16 is longer as the setup time from the start of change in the voltage of the data line Sj to the rising edge of the scanning line Gi is longer. The charging period is longer as the hold time from the falling edge of the gate clock GCK to the start of change in the voltage of the data line Sj is longer. It is assumed here that the hold time of the voltage of the data line Sj is sufficiently long both when the frame frequency is 60 Hz and when the frame frequency is 90 Hz.

In FIG. 12, at time tL, the falling edge of the latch strobe signal LS occurs, and the voltage of the data line Sj starts to change. When the frame frequency is 60 Hz, the falling edge time tGn of the gate clock GCK1 and the voltage of the scanning line Gi is delayed from time tL by Δtn. At this time, the charging period of the pixel circuit 16 becomes a period Cn illustrated in FIG. 12. In contrast, when the frame frequency is 90 Hz, the falling edge time tGs of the gate clock GCK1 and the voltage of the scanning line Gi is advanced from time tL by Δts. At this time, the charging period of the pixel circuit 16 is a period Cs illustrated in FIG. 12.

In the display device 30 according to the first example, the timing control circuit 37 delays the falling edge timing of the gate clock GCK1 from the falling edge timing of the latch strobe signal LS when the frame frequency is 60 Hz, and advances the falling edge timing of the gate clock GCK1 from the falling edge timing of the latch strobe signal LS when the frame frequency is 90 Hz. The length of the charging period of the pixel circuit 16 decreases when the frame frequency is switched from 60 Hz to 90 Hz, and increases when the frame frequency is switched from 90 Hz to 60 Hz.

In FIG. 13, at time tG, the falling edges of the gate clock GCK1 and the voltage of the scanning line Gi occur. When the frame frequency is 60 Hz, the falling edge time tLn of the latch strobe signal LS is advanced from time tG by Δtn. At this time, the charging period of the pixel circuit 16 becomes a period Cn illustrated in FIG. 13. In contrast, when the frame frequency is 90 Hz, the falling time tLs of the latch strobe signal LS is delayed from time tG by Δts. At this time, the charging period of the pixel circuit 16 is the period Cs illustrated in FIG. 13.

In the display device 30 according to the second example, the timing control circuit 37 advances the falling edge timing of the latch strobe signal LS from the falling edge timing of the gate clock GCK1 when the frame frequency is 60 Hz, and delays the falling edge timing of the latch strobe signal LS from the falling edge timing of the gate clock GCK1 when the frame frequency is 90 Hz. The length of the charging period of the pixel circuit 16 decreases when the frame frequency is switched from 60 Hz to 90 Hz, and increases when the frame frequency is switched from 90 Hz to 60 Hz.

In order to solve the problem of the known display device, the display device 30 is provided with the timing control circuit 37 that changes the timing of the control signal output from the display control circuit 32 in accordance with the frame frequency. When the frame frequency is switched higher, the timing control circuit 37 changes the timing of the control signal output from the display control circuit 32 so as to cancel an increase in the luminance of the display screen. When the frame frequency is switched lower, the timing control circuit 37 changes the timing of the control signal output from the display control circuit 32 so as to cancel a decrease in the luminance of the display screen. Therefore, according to the display device 30, it is possible to prevent a display flicker when the frame frequency is switched.

As described above, the display device 30 according to the present embodiment is provided with: the display portion 11 including the plurality of scanning lines G0 to Gm, the plurality of data lines S1 to Sn, and the plurality of pixel circuits 16; the scanning line drive circuit 13 that drives the scanning lines G0 to Gm; and the data line drive circuit 14 that drives the data lines S1 to Sn, and the display device 30 has a function of switching the frame frequency. In the display device 30, the timing of the control signal used to drive the display portion 11 changes in accordance with the frame frequency, so that the length of the charging period of the pixel circuit 16 changes in accordance with the frame frequency. The length of the charging period decreases when the frame frequency is switched higher, and increases when the frame frequency is switched lower.

In the display device 30 according to the first example, the timing at which the clock signal (gate clocks GCK1, GCK2) supplied to the scanning line drive circuit 13 changes is advanced when the frame frequency is switched higher, and is delayed when the frame frequency is switched lower. In the display device 30 according to the second example, the timing at which the control signal (latch strobe signal LS) indicating the timing to start applying the voltage to the data lines S1 to Sn changes is delayed when the frame frequency is switched higher, and is advanced when the frame frequency is switched lower.

According to the display device 30 of the present embodiment, the length of the charging period of the pixel circuit 16 changes in accordance with the frame frequency, so that it is possible to cancel the change in the luminance of the screen due to the switching of the frame frequency and to prevent a display flicker when the frame frequency is switched.

Note that the timings illustrated in FIGS. 12 and 13 are merely examples, and the timings at which the gate clocks GCK1, GCK2 and the latch strobe signal LS change may be any timings as long as the timings change as described above in accordance with the frame frequency. For example, the falling edge timing of the gate clock GCK1 and the falling edge timing of the latch strobe signal LS may be the same.

Figure 14:
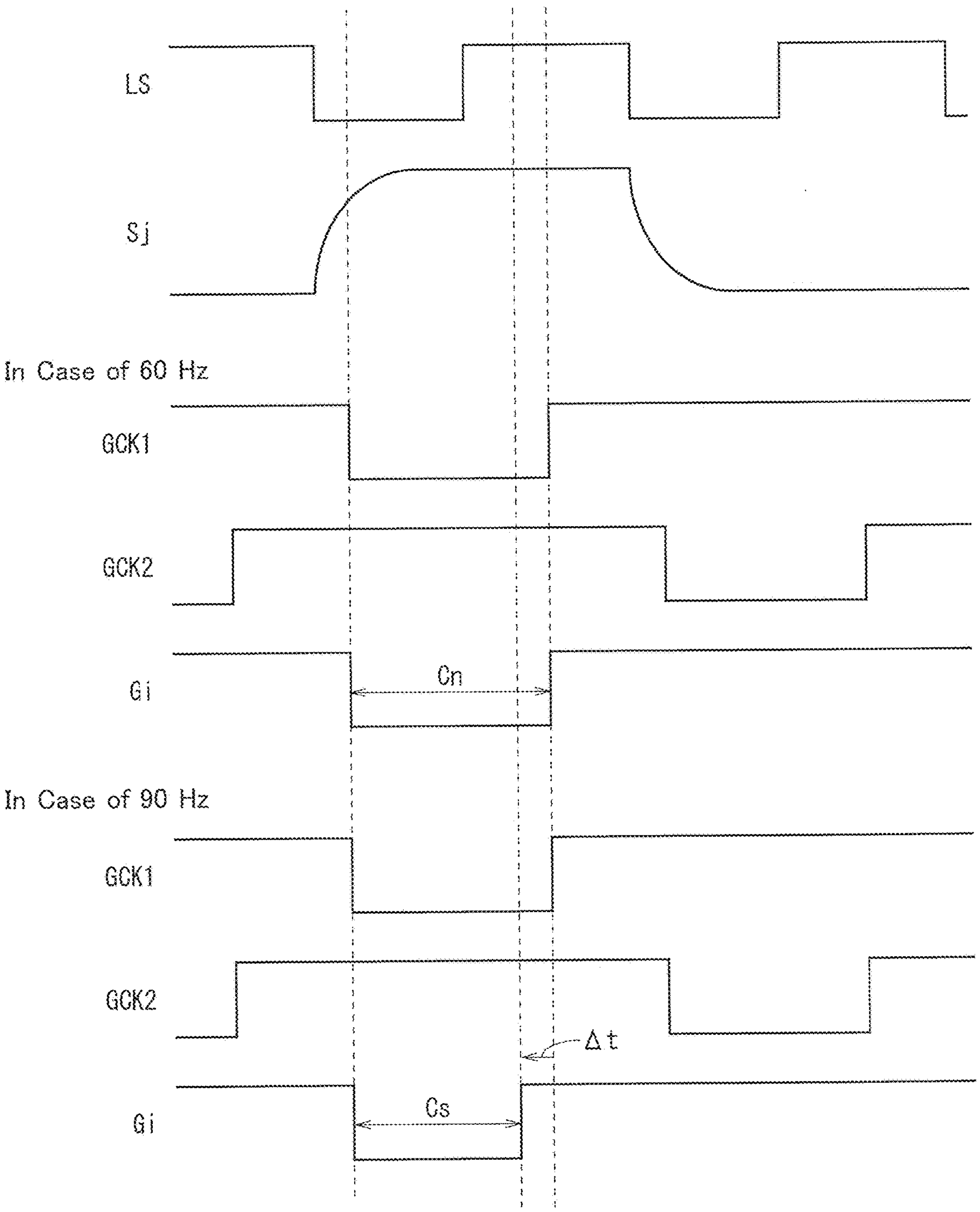
FIG. 14 is a timing chart of a display device according to a first modification of the third embodiment.

The display device 30 according to the present embodiment can form the following modifications. FIG. 14 is a timing chart of a display device according to a first modification. In FIG. 14, the timing at which the gate clock GCK1 and the voltage of the scanning line Gi change to the low level is the same between when the frame frequency is 60 Hz and when the frame frequency is 90 Hz. When the frame frequency is 90 Hz, the timing at which the gate clock GCK1 and the voltage of the scanning line Gi change to the high level is advanced by Δt from when the frame frequency is 60 Hz. Therefore, the length of the charging period of the pixel circuit 16 decreases when the frame frequency is switched from 60 Hz to 90 Hz, and increases when the frame frequency is switched from 90 Hz to 60 Hz.

Figure 15:
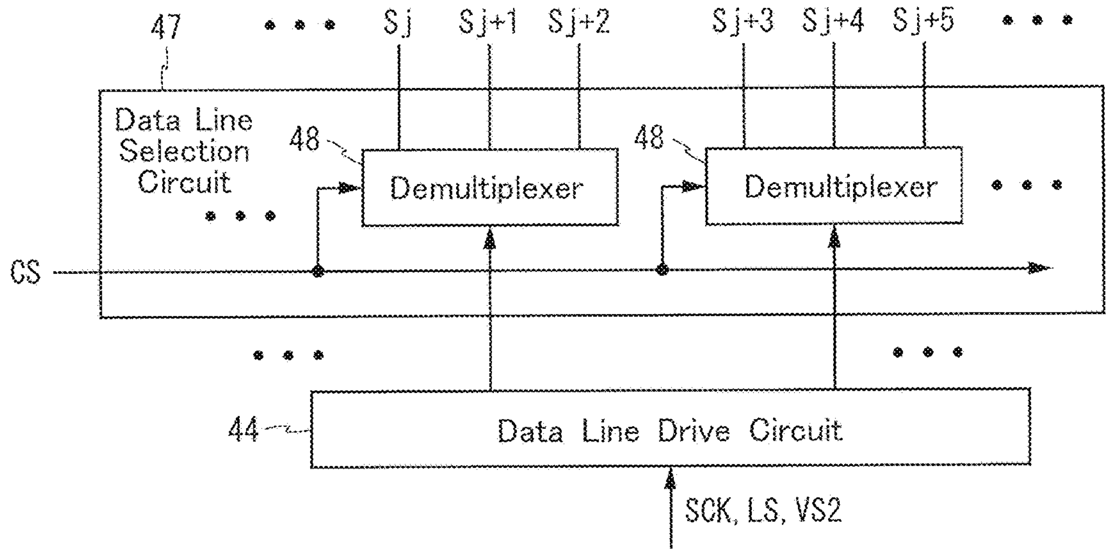
FIG. 15 is a block diagram illustrating a part of a display device according to a second modification of the third embodiment.

FIG. 15 is a block diagram illustrating a part of a display device according to a second modification. The display device according to the second modification drives the data lines in a time division manner. Specifically, the data lines S1 to Sn are grouped in groups of three, and a data line drive circuit 44 outputs one data voltage for each of the three data lines. A data line selection circuit 47 is provided between the data line drive circuit 44 and the data lines S1 to Sn. The data line selection circuit 47 includes a plurality of demultiplexers 48 corresponding to the groups of data lines. Each demultiplexer 48 has an input terminal connected to one of the output terminals of the data line drive circuit 44, from the one of the output terminals a data voltage being output to be applied to any one of three data lines in a corresponding one of the groups. The output terminals of each demultiplexer 48 are connected to the three data lines in the corresponding one of the groups. A control signal CS is supplied to the control terminal of each demultiplexer 48. The data line selection circuit 47 thus configured selects the data line to which the output voltage of the data line drive circuit 44 is applied from among the three data lines. The length of the charging period of the pixel circuit 16 is determined by a period during which the data line drive circuit 44 outputs the data voltage and a period during which the control signal CS is at a selection level (e.g., low level).

In the display device according to the second modification, the timing at which the control signal CS supplied to the data line selection circuit 47 changes is delayed when the frame frequency is switched higher, and is advanced when the frame frequency is switched lower. Therefore, the length of the charging period of the pixel circuit 16 decreases when the frame frequency is switched higher, and increases when the frame frequency is switched lower. With the display device according to each of the first and second modifications, the same effects as those of the display device 30 can be obtained.

The organic EL display device provided with the pixel circuit including the organic EL element (organic light-emitting diode) has been described above as an example of the display device provided with the pixel circuit including the light-emitting element, but the following devices may be configured by a similar manner: an inorganic EL display device provided with a pixel circuit including an inorganic light-emitting diode; a quantum-dot light-emitting diode (QLED) display device provided with a pixel circuit including a quantum dot light-emitting diode; and a light-emitting diode (LED) display device provided with a pixel circuit including a mini LED or a micro LED. The features of the display devices described above may be arbitrarily combined as long as the features are not contrary to the nature thereof to construct a display device having the features of the above embodiments and modifications.

DESCRIPTION OF REFERENCE CHARACTERS

10, 20, 30: Display Device
11: Display portion
12, 22, 32: Display Control Circuit
13: Scanning Line Drive Circuit
14, 24, 44: Data Line Drive Circuit
15: Light-Emission Control Line Drive Circuit
16: Pixel Circuit
17: Gradation Conversion Circuit
27: Voltage Generation Circuit
37: Timing Control Circuit
47: Data Line Selection Circuit
48: Demultiplexer

The invention claimed is:

1. A display device having a function of switching a frame frequency, the display device comprising:
- a display unit that includes a plurality of scanning lines, a plurality of data lines, and a plurality of pixel circuits;
- a scanning line drive circuit configured to drive the scanning lines; and
- a data line drive circuit configured to drive the data lines, wherein
- a level of a data voltage applied to each of the data lines changes in accordance with the frame frequency, and
- the level of the data voltage decreases when the frame frequency is switched higher, and the level of the data voltage increases when the frame frequency is switched lower.

2. The display device according to claim 1, wherein the level of the data voltage changes when the frame frequency is switched, and the level of the data voltage returns to an initial level over a plurality of frame periods.

3. The display device according to claim 1, further comprising a gradation conversion circuit configured to perform gradation conversion on a video signal in accordance with the frame frequency,
- wherein the data line drive circuit generates the data voltage based on a video signal after gradation conversion.

4. The display device according to claim 1, wherein the data line drive circuit includes a voltage generation circuit configured to generate the data voltage based on a video signal and the frame frequency.

5. A display device having a function of switching a frame frequency, the display device comprising:
- a display portion that includes a plurality of scanning lines, a plurality of data lines, and a plurality of pixel circuits;
- a scanning line drive circuit configured to drive the scanning lines; and
- a data line drive circuit configured to drive the data lines, wherein
- a timing of a control signal used to drive the display portion changes in accordance with the frame frequency to cause a length of a charging period of each of the pixel circuits to change in accordance with the frame frequency, and
- the length of the charging period decreases when the frame frequency is switched higher, and the length of the charging period increases when the frame frequency is switched lower.

6. The display device according to claim 5, wherein a timing at which a clock signal supplied to the scanning line drive circuit changes is advanced when the frame frequency is switched higher, and the timing is delayed when the frame frequency is switched lower.

7. The display device according to claim 5, wherein a timing at which a control signal indicating a start timing of application of a voltage to each of the data lines changes is delayed when the frame frequency is switched higher, and the timing is advanced when the frame frequency is switched lower.

8. The display device according to claim 5, further comprising a data line selection circuit configured to select a data line to which an output voltage of the data line drive circuit is applied from among a predetermined number of data lines,
- wherein a timing at which a control signal supplied to the data line selection circuit changes is delayed when the frame frequency is switched higher, and the timing is advanced when the frame frequency is switched lower.

9. A method for driving a display device that includes a display portion including a plurality of scanning lines, a plurality of data lines, and a plurality of pixel circuits, and having a function of switching a frame frequency, the method comprising:
- driving the scanning lines; and
- driving the data lines, wherein a level of a data voltage applied to each of the data lines changes in accordance with the frame frequency, and the level of the data voltage decreases when the frame frequency is switched higher, and the level of the data voltage increases when the frame frequency is switched lower.

10. The method for driving a display device according to claim 9, wherein the level of the data voltage changes when the frame frequency is switched, and the level of the data voltage returns to an initial level over a plurality of frame periods.

* * * * *